(12) United States Patent
Burt

(10) Patent No.: US 8,833,384 B2
(45) Date of Patent: Sep. 16, 2014

(54) ADVANCED VALVE ACTUATION SYSTEM WITH INTEGRAL FREEZE PROTECTION

(75) Inventor: Alan Burt, Rockford, IL (US)

(73) Assignee: Schneider Electric Buildings, LLC, North Andover, MA (US)

( * ) Notice: Subject to any disclaimer, the term of this patent is extended or adjusted under 35 U.S.C. 154(b) by 215 days.

(21) Appl. No.: 13/567,818

(22) Filed: Aug. 6, 2012

(65) Prior Publication Data

US 2014/0034145 A1    Feb. 6, 2014

(51) Int. Cl.
*F16K 17/38* (2006.01)
(52) U.S. Cl.
USPC .............. 137/80; 137/59; 137/487.5; 62/151; 62/272; 700/286; 237/80
(58) Field of Classification Search
USPC .......... 137/59, 62, 78.1, 78.5–80, 485–492.5; 237/80; 700/276, 278; 62/150, 151, 62/272
See application file for complete search history.

(56) References Cited

U.S. PATENT DOCUMENTS

| | | | |
|---|---|---|---|
| 1,558,276 A | 10/1925 | Peterson | |
| 1,820,473 A | 8/1931 | Milone | |
| 3,369,556 A | 2/1968 | Allderdice | |
| 3,636,765 A | 1/1972 | Brown | |
| 3,761,196 A | 9/1973 | Weinert | |
| 3,880,399 A | 4/1975 | Luthe | |
| 4,028,689 A | 6/1977 | Schopp | |
| 4,036,051 A | 7/1977 | Fell et al. | |
| 4,066,090 A | 1/1978 | Nakajima et al. | |
| 4,108,210 A | 8/1978 | Luthe et al. | |
| 4,149,563 A | 4/1979 | Seger | |
| 4,224,825 A | 9/1980 | Feller | |
| 4,245,501 A | 1/1981 | Feller | |
| 4,250,747 A | 2/1981 | Diprose et al. | |
| 4,286,613 A | 9/1981 | Lacoste | |

(Continued)

FOREIGN PATENT DOCUMENTS

| | | |
|---|---|---|
| JP | H0658598 A | 3/1994 |
| JP | H06300397 A | 10/1994 |
| JP | 2004028476 A | 1/2004 |

OTHER PUBLICATIONS

Knowledge is Power—The Belimo Energy Valve™; brochure; known prior to Aug. 6, 2012; 4 pages; Belimo Americas, Danbury, CT.

(Continued)

*Primary Examiner* — Craig Schneider
*Assistant Examiner* — Reinaldo Sanchez-Medina
(74) *Attorney, Agent, or Firm* — Reinhart Boerner Van Deuren P.C.

(57) ABSTRACT

A valve and actuator assembly includes a valve to control a flow of liquid into a coil, and an actuator to control the valve. The assembly includes a first temperature sensor to sense the temperature of liquid flowing through the valve, a second temperature sensor to sense the temperature of air surrounding the coil, and a flow meter to measure a flow rate of liquid through the valve. The actuator includes a module that receives data from the first and second temperature sensors and from the flow meter, and determines, based on data received from the flow meter and temperature sensors, a likelihood that the liquid in the coil will freeze. The actuator operates the valve to allow a minimum flow of the liquid through the valve and coil during a potential freeze condition. The minimum flow is sufficient to prevent the liquid in the coil from freezing.

22 Claims, 8 Drawing Sheets

(56) References Cited

U.S. PATENT DOCUMENTS

| | | |
|---|---|---|
| 4,333,354 A | 6/1982 | Feller |
| 4,388,003 A | 6/1983 | Feller |
| 4,393,919 A | 7/1983 | Anderson |
| 4,403,871 A | 9/1983 | Feller |
| 4,412,647 A | 11/1983 | Lampert |
| 4,415,279 A | 11/1983 | Beuse et al. |
| 4,469,118 A | 9/1984 | Walters |
| 4,473,307 A | 9/1984 | Dobronyi et al. |
| 4,482,006 A | 11/1984 | Anderson |
| 4,567,915 A | 2/1986 | Bates et al. |
| 4,635,668 A | 1/1987 | Netter |
| 4,650,155 A | 3/1987 | Liantonio |
| 4,657,038 A | 4/1987 | Lyons |
| 4,679,592 A | 7/1987 | Lamb |
| 4,694,390 A | 9/1987 | Lee |
| 4,739,794 A | 4/1988 | Ballun |
| 4,848,389 A | 7/1989 | Pirkle |
| 4,860,993 A | 8/1989 | Goode |
| 4,909,076 A | 3/1990 | Busch et al. |
| 5,018,703 A | 5/1991 | Goode |
| 5,090,436 A | 2/1992 | Hoch, Jr. et al. |
| 5,113,892 A | 5/1992 | Hull et al. |
| 5,220,937 A | 6/1993 | Roberts et al. |
| 5,402,822 A | 4/1995 | Brouwer et al. |
| 5,428,994 A | 7/1995 | Wenzel et al. |
| 5,553,505 A | 9/1996 | Bignell et al. |
| 5,643,482 A * | 7/1997 | Sandelman et al. .......... 219/497 |
| 5,692,535 A | 12/1997 | Walters |
| 5,758,684 A | 6/1998 | Hudson et al. |
| 5,775,369 A | 7/1998 | Hagmann |
| 6,012,294 A * | 1/2000 | Utsumi ............................ 62/81 |
| 6,039,304 A | 3/2000 | Carlson et al. |
| 6,056,008 A | 5/2000 | Adams et al. |
| 6,125,873 A | 10/2000 | Brown |
| 6,155,283 A | 12/2000 | Hansen et al. |
| 6,161,764 A | 12/2000 | Jatnieks |
| 6,352,106 B1 | 3/2002 | Hartman |
| 6,505,991 B2 | 1/2003 | Roman |
| 6,534,942 B2 | 3/2003 | Schmidhuber |
| 6,612,331 B2 | 9/2003 | Cederstav et al. |
| 6,622,930 B2 | 9/2003 | Laing et al. |
| 6,663,349 B1 | 12/2003 | Discenzo et al. |
| 6,725,167 B2 | 4/2004 | Grumstrup et al. |
| 6,814,096 B2 | 11/2004 | Vyers et al. |
| 6,820,631 B2 | 11/2004 | Lehnst et al. |
| 6,827,100 B1 | 12/2004 | Carlson |
| 6,837,480 B1 | 1/2005 | Carlson |
| 6,859,740 B2 | 2/2005 | Stephenson et al. |
| 6,889,559 B2 | 5/2005 | Gimson |
| 6,954,683 B2 | 10/2005 | Junk et al. |
| 7,025,328 B2 | 4/2006 | Ulicny et al. |
| 7,096,093 B1 | 8/2006 | Hansen et al. |
| 7,104,461 B2 | 9/2006 | Restivo, Sr. et al. |
| 7,152,628 B2 | 12/2006 | Folk et al. |
| 7,166,981 B2 | 1/2007 | Kakutani et al. |
| 7,178,783 B2 | 2/2007 | Tuin et al. |
| RE39,658 E | 5/2007 | Carlson et al. |
| 7,228,869 B2 | 6/2007 | Wilhelm |
| 7,231,931 B2 | 6/2007 | Lull et al. |
| 7,246,941 B2 | 7/2007 | Shike |
| 7,266,427 B2 | 9/2007 | Hansen et al. |
| 7,434,477 B2 | 10/2008 | Lull et al. |
| 7,451,781 B2 | 11/2008 | Carlson |
| 7,637,723 B2 | 12/2009 | Sadasivam |
| 7,691,652 B2 | 4/2010 | Van Der Wiel |
| 7,734,572 B2 | 6/2010 | Wiemeyer et al. |
| 7,798,170 B2 | 9/2010 | Hotz et al. |
| 2001/0030309 A1 | 10/2001 | Carlson et al. |
| 2002/0123856 A1 | 9/2002 | Eryurek |
| 2004/0173261 A1 | 9/2004 | Stoffers |
| 2005/0039797 A1 | 2/2005 | Carlson |
| 2006/0037646 A1 | 2/2006 | Wilhelm |
| 2006/0234414 A1 | 10/2006 | Van Der Wiel |
| 2006/0260698 A1 | 11/2006 | Bailey et al. |
| 2007/0012367 A1 | 1/2007 | Hotz et al. |
| 2008/0173838 A1 | 7/2008 | Schmidig et al. |
| 2008/0307879 A1 | 12/2008 | Borst et al. |
| 2009/0009115 A1 | 1/2009 | Grogg et al. |
| 2010/0107755 A1 | 5/2010 | Van Der Weil |
| 2010/0142535 A1 | 6/2010 | Swainston |
| 2010/0251742 A1 | 10/2010 | Tucker et al. |
| 2011/0153089 A1 | 6/2011 | Tiemann et al. |

OTHER PUBLICATIONS

Knowledge is Power—Belimo Energy Valve™, presentation; known prior to Aug. 6, 2012; 45 pages.

* cited by examiner

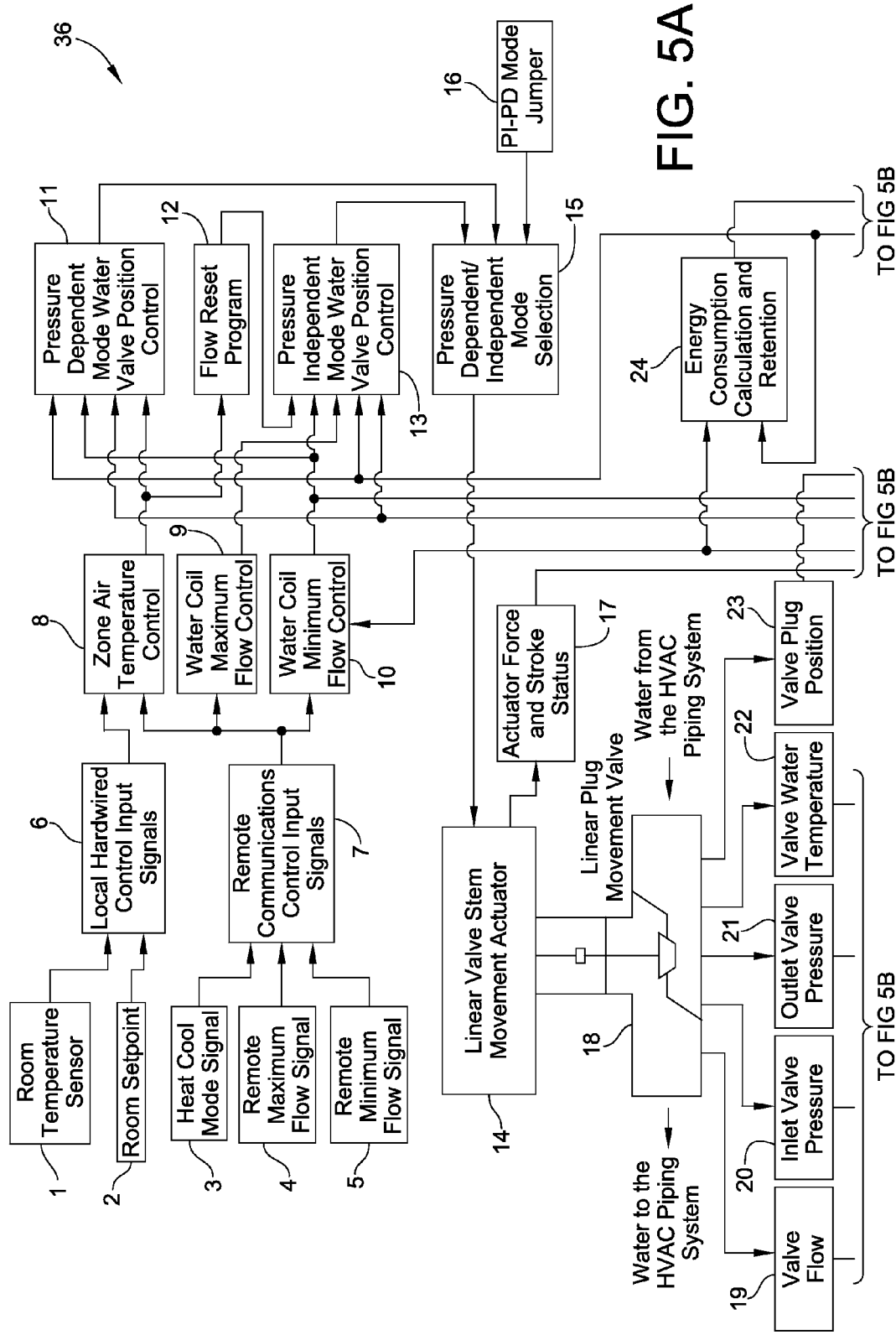

ADVANCED VALVE ACTUATION SYSTEM WITH INTEGRAL FREEZE PROTECTION

FIELD OF THE INVENTION

This invention generally relates to valves and valve actuators, and more particularly, to valves and valve actuators used in heating, ventilation, and air conditioning (HVAC) systems.

BACKGROUND OF THE INVENTION

Frozen heating, ventilation, and air conditioning (HVAC) water coils can occur during cold seasons and this may cause problems in liquid phase heat transfer systems. There are two general types of heat transfer systems—liquid phase and vapor/liquid phase. Liquid phase systems operate by transfer of sensible heat or a change in temperature. Vapor/liquid systems transfer heat with the heat of vaporization by a boiling condensing cycle.

As water expands into ice, it increases in volume by about 9% and consequently may create excessive force on any pipe or valve containing it. Heating and cooling coils typically consist of serpentined rows of tubes (usually copper) that pass through sheets of formed fins (usually aluminum). As air passes through the coil and contacts the fin surfaces, heat transfers from the air to the water in the tubes. Since the heating and cooling coils consist of a significant length of tubes that can have contact with potentially very cold air, the water in these coils is susceptible to freezing.

In addition to any damage to the water coils, lines, and fittings extensive building damage can occur to the walls, ceiling, and building contents due to the freezing of water in the coils. When this occurs, often the water will leak out until it is detected and the water supply shut off. The water supply shut off also disrupts other portions of the building because the centralized piping system may serve sections of the building with multiple rooms such as complete floors. The leakage also may not be noticed immediately because it may have occurred when the building was not occupied, or may be in a location that is not readily accessible, allowing for the possibility of extensive water damage before the leak is detected.

With conventional HVAC systems, commonly-used water coil freeze protection methods have been to combine several components together to obtain freeze protection based on the correlation between a local air temperature and the water temperature in the coil and connected pipes, and then utilize a full uncontrolled flow rate when a potential freeze condition is sensed. Conventional freeze protection methods are typically used for protection of domestic water pipes from a freeze condition, and these systems are not necessarily ideal for use in HVAC water coil systems. Some conventional freeze protection systems are limited in that they estimate the water temperature from a nearby air temperature, and typically require multiple devices to be mounted and connected, thereby increasing the installation time, system cost, and the number of devices to maintain.

Furthermore, with conventional HVAC systems, the control valves may have a maximum flow setting that can be locally set, but which is not adjustable from a remote location. Further, many conventional HVAC systems cannot properly handle HVAC control applications involving top pipe changeover heating/cooling water systems, seasonal changeovers, and energy synchronization with a building's centrifugal chillers and condensing boilers, or with the building management system (BMS). A building management system implemented using a communications network is disclosed in U.S. Patent Publication No. 2010/0142535, the teachings and disclosure of which is incorporated herein by reference thereto.

Embodiments of the present invention represent an advancement over the state of the art with respect to HVAC systems and the control thereof. These and other advantages of the invention, as well as additional inventive features, will be apparent from the description of the invention provided herein.

BRIEF SUMMARY OF THE INVENTION

In one aspect, embodiments of the invention provide an HVAC valve and actuator assembly with integral freeze protection includes a valve configured to control a flow of water or a water mixture into a water coil, and a valve actuator configured to control opening and closing of the valve. The valve and actuator assembly also includes a first temperature sensor configured to sense the temperature of the water or water mixture flowing through the valve, a second temperature sensor configured to sense the temperature of air surrounding the water coil, and a flow meter configured to measure a flow rate of the water or water mixture through the valve. The valve actuator includes a control module configured to receive data from the first and second temperature sensors and from the flow meter, and further configured to determine, based on data received from the flow meter and first and second temperature sensors, a likelihood that the water or water mixture in the water coil will freeze. The valve actuator operates the valve to allow a minimum flow of the water or water mixture through the valve and water coil during a potential freeze condition. The minimum flow is sufficient to prevent the water or water mixture in the water coil from freezing.

In a particular embodiment, the valve includes a throttling plug disposed in a flow passage of the valve, the throttle plug moveable within the valve to control the flow of water or water mixture in the flow passage. In this embodiment, the valve actuator includes a motor and geartrain coupled to the throttling plug by a linkage assembly, and a circuit board having control circuitry to regulate operation of the motor and geartrain, with communications circuitry to enable the actuator to communicate with a building management system via a serial communications bus. Further, the valve actuator may be configured to operate the valve as either a pressure-independent valve or a pressure-dependent valve. In a more particular embodiment, the valve actuator is configured to operate the valve as either a pressure-independent valve or a pressure-dependent valve by the setting of a jumper switch. When the valve actuator operates the valve as a pressure-independent valve, the pressure-independent valve has a minimum flow rate to prevent a freeze condition in the water coil, and a maximum flow rate over a defined differential pressure range.

In particular embodiments, the valve actuator has a plurality of adjustable operating parameters, whose values control the operation of the valve actuator. Further, the plurality of adjustable operating parameters can be adjusted either locally or remotely.

In another aspect, embodiments of the invention provide a method of operating a valve and actuator assembly with integral freeze protection. The method includes the steps of sensing a temperature of liquid flowing through an HVAC valve into an HVAC coil used to heat or cool a space, sensing a temperature of air surrounding the HVAC coil, and measuring a flow rate of the liquid flowing through the HVAC valve. The method also includes determining a likelihood, based on the sensed liquid and air temperatures and on the flow rate measurement, that the liquid in the HVAC coil will freeze, and controlling the flow of liquid through the HVAC valve and HVAC coil to provide a minimum flow sufficient to prevent freezing of the liquid in the HVAC coil.

In certain embodiments, the method includes determining a likelihood that the liquid in the HVAC coil will freeze, based on whether the liquid is water or water mixed with a known concentration of anti-freeze. In some embodiments, controlling the flow of liquid through the HVAC valve and HVAC coil to provide a minimum flow sufficient to prevent freezing of the liquid in the HVAC coil involves providing the minimum flow sufficient to prevent freezing of the liquid in the HVAC coil until the liquid temperature rises to a target temperature at least 10 degrees above a freeze temperature setpoint, for a time period of at least five minutes. Further, the method may include setting the freeze temperature setpoint, the target temperature, and the time period, wherein a user can set the freeze temperature setpoint, the target temperature, and the time period either locally or remotely.

In further embodiments, the method includes discontinuing the minimum flow sufficient to prevent freezing of the liquid in the HVAC coil if it is determined that there is no likelihood that the liquid in the HVAC coil will freeze.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 5A and 5B are schematic block diagrams of an HVAC system and integrated valve and actuator assembly, constructed in accordance with an embodiment of the invention;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
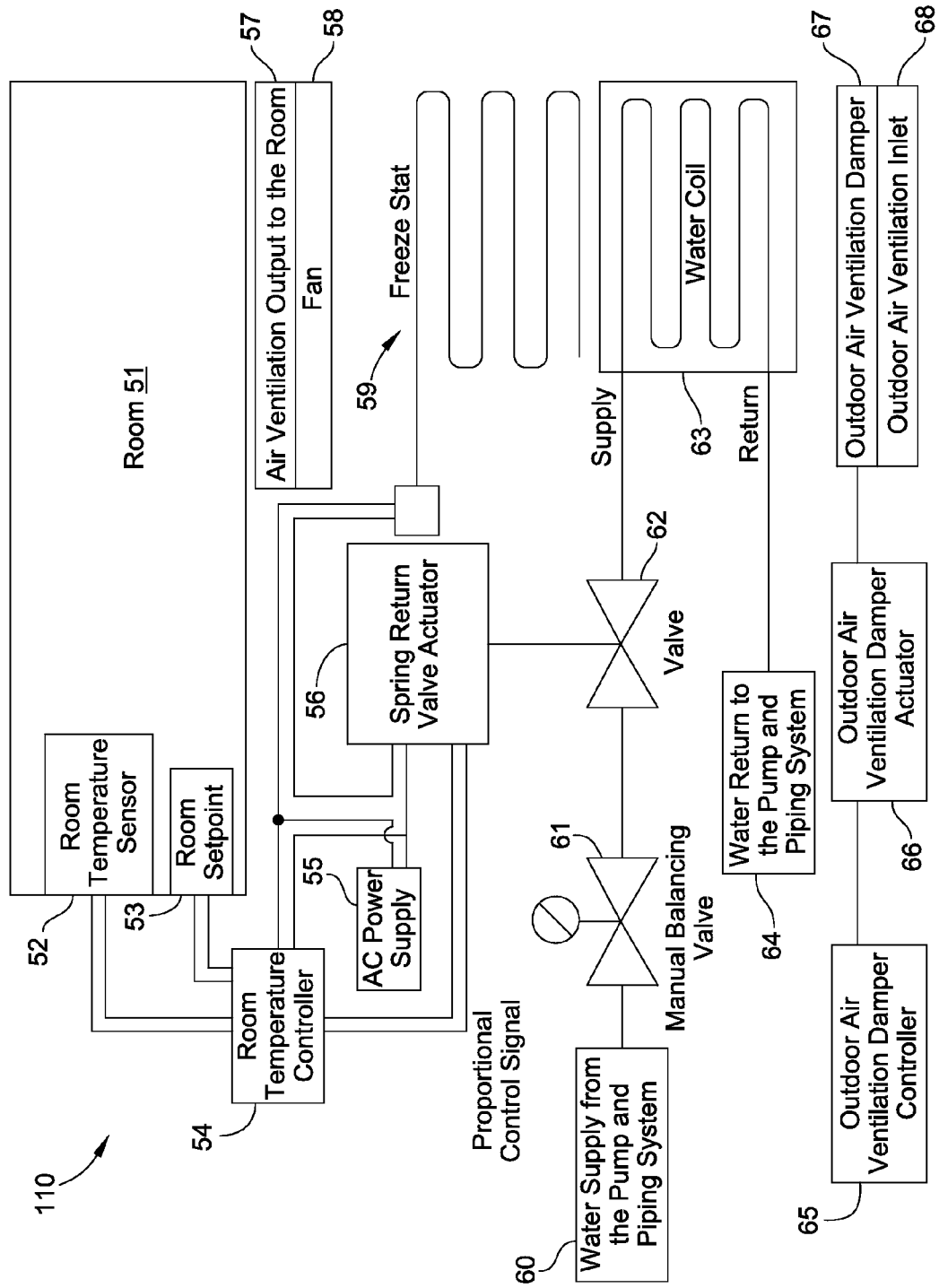
FIG. 1 is a schematic diagram of a prior art HVAC valve configuration with water coil freeze protection.

FIGS. 1-4 are schematic illustrations showing various embodiments of HVAC systems provided in the prior art. For example, FIG. 1 is a schematic diagram showing a conventional HVAC system 110 that requires multiple devices to obtain the required water valve control and water coil freeze protection. The source of the hot and cold water for the water supply from the pump and piping system 60 is generally located outside of the room 51, and is usually a centralized supply consisting of one or more boilers or chillers (not shown) that can be alternately connected within the source. The valve 62 modulates the flow of hot and cold water from the water supply from the pump and piping system 60 for heating and/or cooling of the room 51. Typically, the valve 62 is mechanically driven by the spring return valve actuator 56 that is operatively connected in accordance with the control signal provided by the room temperature controller 54. In typical embodiments, the room temperature controller 54 receives a temperature sensing signal from the room temperature sensor 52 and compares it to the desired room temperature setpoint that is provided by the room setpoint device 53, which can be a potentiometer or keypad, for example.

In the embodiment shown, the spring return valve actuator 56 operates from a proportional control signal received from the room temperature controller 54 to manually position the valve 62 from full closed to full open to maintain the desired room setpoint as provided by the room setpoint device 53. The room 51 air temperature is controlled by having air pass through a water coil 63 with an appropriate volume of hot or cold water to provide the necessary temperature differential between the water coil 63 temperature and the room 51 temperature to drive the room 51 temperature toward the desired room setpoint device 53. The water coil 63 uses hot or cold water that is provided by the central boiler and chiller system, for example, delivered by the water supply from the pump and piping system 60. Generally, each room has its own piping system. When it is desired to operate the systems in the heating mode, the water supply from the pump and piping system 60 provides hot water, from a boiler for example, and when it is desired to operate the system in the cooling mode, the water supply from the pump and piping system 60 provides cold water, from a chiller for example.

The outdoor air ventilation inlet 68 and outdoor air ventilation damper 67 are used to provide fresh air to the room. The volume of fresh air is controlled by the outdoor air ventilation damper controller 65 which mechanically positions the outdoor air ventilation damper actuator 66. There are a number of damper actuator control methods that are commonly used. With all methods there is a risk that cold outdoor air can freeze the water in the water coil 63 and cause significant property damage. Common outdoor air damper issues include damper blades that do not close tightly due to wear, warping, or other damage, loose or damaged mechanical linkages, and actuator failure.

Figure 2:
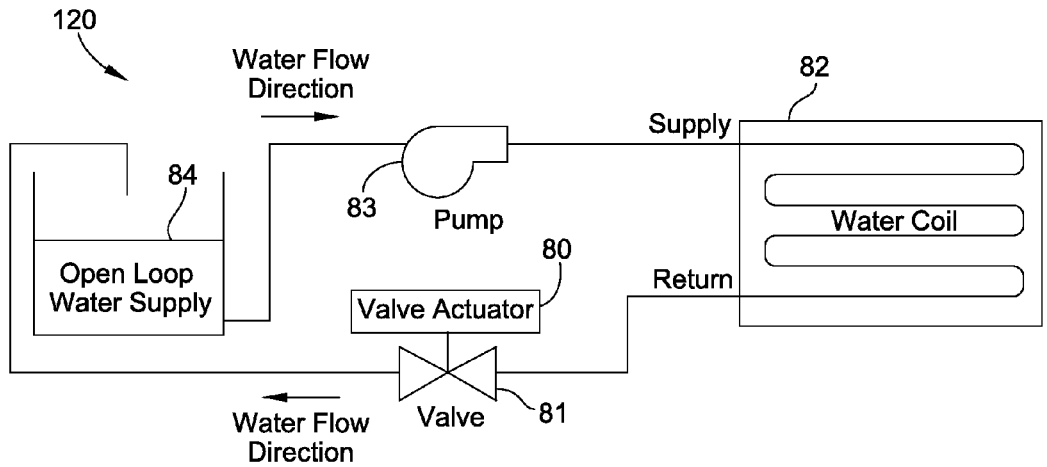
FIG. 2 is a schematic diagram of a prior art HVAC valve and coil locations for an open loop water system.
Figure 3:
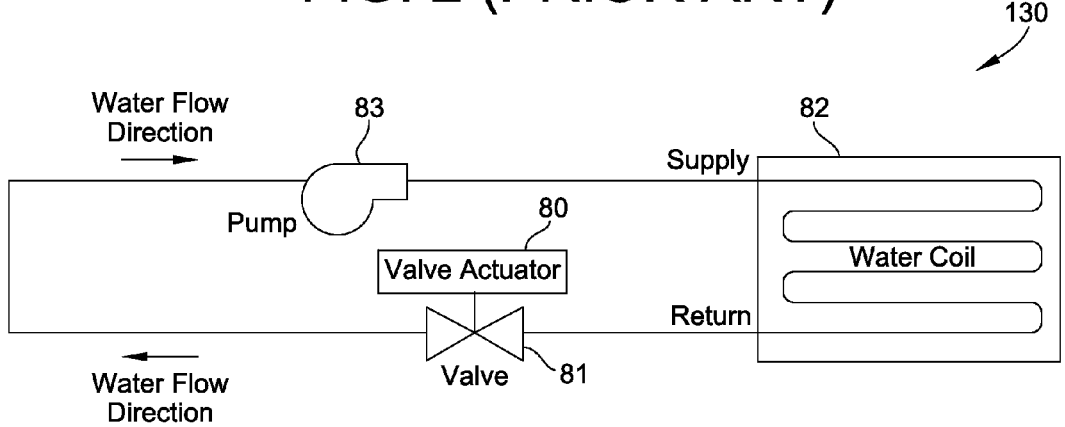
FIG. 3 is a schematic diagram of a prior art HVAC valve and coil locations for a closed loop water system with the valve on the return side of the coil.
Figure 4:
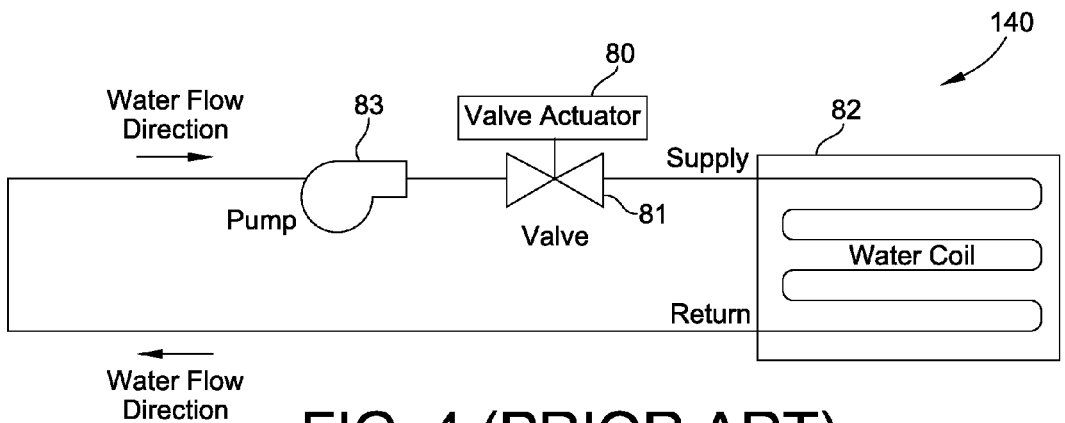
FIG. 4 is a schematic diagram of a prior art HVAC valve and coil locations for a closed loop water system for the valve on the supply side of the coil.

Piping systems can either be open loop systems 120, such as the one shown in FIG. 2, or closed loop systems 130, 140, like those shown in FIG. 3 and FIG. 4, respectively. With the open loop system 120 of FIG. 2 for example, the valve actuator 80 and valve 81 must be on the return side of the water coil 63, 82 to ensure that the water coil 82 tubes are full of water to obtain good heat transfer because open loop systems typically have a large amount of air in the system that can interfere with the heat transfer. With closed loop systems 130, 140, the valve actuator 80 and valve 81 can be on the return side of the of the water coil 82 as shown in FIG. 3 or can be on the supply side of the water coil 63, 82 as shown in FIG. 4.

Having the closed loop valve actuator 80 and valve 81 on the supply side of the of the water coil 63, 82, as shown in FIG. 4, will work but will have a higher probability of having air in the water coil 63, 82 that will interfere with the heat transfer. With the closed loop valve actuator 80 and valve 81 on the return side of the of the water coil 63, 82, as shown in FIG. 3, thermal transfer will be better with less air in the water coil 63, 82, but there is a higher risk of water in the coil 63, 82 freezing. This is because air is compressible, and systems with more air in the water coil 63, 82 are able to absorb some of the increased pressures resulting from a freeze condition due to the aforementioned compressibility of the air. Water in systems having less air in the water coil 82 are more prone to freeze conditions Not surprisingly, the probability of a coil freeze condition is most likely to occur in the heating mode because the outdoor air temperature is cold. For water in the water coil 63, 82 to freeze, there water therein must be somewhat stationary and exposed to cold temperatures for a period of time sufficient to lower the water temperature below 32° F. (0° C.). When the outdoor air temperature is very cold, the room temperature is likely to be cold and the valve at least partially open, which can reduce the possibility of a water coil freeze condition.

With milder outdoor air temperatures that are below 32° F. (0° C.) but not cold enough to necessarily cause the room 51 temperature to be uncomfortably cold, there can be a significant risk of water in the water coil 63, 82 freezing, since the valve 62 may be closed because the room 51 does not require heat such that the water in the water coil 63, 82 is not flowing, thus giving rise to a potential freeze condition.

With the conventional HVAC system 110 shown in FIG. 1, a freeze stat 59 is wired in series with the spring return valve actuator 56. When the freeze stat 59 detects a potential freeze condition, it will discontinue power to the spring return valve actuator 56, which, in some instances, has an internal spring mechanism to drive it to a known position upon loss of power. It is often the case that this known position is the fully open valve position, such that the valve 62 protects the water coil 63 and piping system from freezing, even if a lower volume of flow would be adequate to prevent the freeze condition. This approach tends to waste energy. In some cases, the freeze stat 59 may also provide power to the outdoor air ventilation damper actuator 66, which may also have spring return operation to close off the outdoor air ventilation damper 67 if the freeze stat 59 detects a potential freeze condition.

Freeze stats 59 are usually available with automatic reset or manual reset. After sensing cold air temperature, a manual reset freeze 59 stat remains open and provides full valve flow until the freeze stat 59 has been identified and manually reset. An automatic reset freeze stat 59 will automatically reset if the air temperature decreases below freezing and then warms up above freezing. This eliminates the need for the user to reset the freeze stat 59, but typically does not alert the user that there may be a problem with the outdoor air ventilation damper controller 65, outdoor air ventilation damper actuator 66, or outdoor air ventilation damper 67. The type of freeze stat 59 selected is generally based on the aforementioned trade-offs between the manual reset and automatic reset technologies. The manual reset freeze stat 59 requires the user to reset the device, which requires more labor and can waste energy before reset occurs, while the automatic reset freeze stat 59 requires less labor but can delay the identification of a damper-related problem that can cause future problems.

Still referring to FIGS. 1-4, the ability of the freeze stat 59 to properly protect the water coil 63 is dependent upon the proper installation of the freeze stat 59, the length of the freeze stat 59 relative to the area of the water coil 63, and any air movement stratification across the water coil 63 as a result of any outdoor air ventilation inlet 67 whose temperature may be improperly sensed by the freeze stat 59. Almost all building HVAC specifications require that there shall not be less than one lineal foot of freeze stat capillary length per square foot of water coil water surface area.

In particular embodiments, the freeze stat 59 is mounted close to the water coil 63 in a symmetrical pattern that provides uniform coverage with equal spacing across the full length and width of the water coil 63. The freeze stat 59 typically would be located in the air stream at the output of the water coil 63 as shown in FIG. I. Some systems may have a second water coil between the water coil 63 and the fan 58, and air ventilation output to the room 57 to provide both heating and cooling. These systems with two coils would have the freeze stat 59 located after the first water coil 63, typically used for heating, and before the second coil, typically used for cooling, located before the fan 58 and air ventilation to the room 57. These systems with two coils would also have their necessary valve, valve actuator, manual balancing valve, water supply from the pump and piping system, and room temperature controller to provide synchronization with the thermal transfer provided by the first water coil 63. While there are several other variations of coil configurations in systems with one, two, or more coils, the freeze stat 59 will not be located further downstream from the output of the closest coil located near the outdoor air ventilation damper 67 and outdoor air ventilation inlet 68.

The length of the freeze stat 59 capillary should be such that it allows proper representation of the water coil's full length and width, as too short a capillary will not properly cover the water coil 63, and too long a capillary will cause unequal representation from a non-symmetrical pattern. Generally, the freeze stat 59 capillary has to be carefully mounted using bends with minimum radius of 3" (76 mm) with support clips to avoid cracking the capillary which will cause eventual failure. Since the freeze stat 59 is only available with a few available capillary lengths this issue of matching the freeze stat length to the water coil area is a frequent occurrence. Many building HVAC specifications require a minimum element length of 25 feet (762 cm) with the capability of tripping if any on foot (25 cm) section drops below the freeze stat setpoint in an attempt to obtain more accurate freeze protection.

The freeze stat 59 mounting with a symmetrical uniform pattern across the coil is based on the assumption that the air flow across the water coil 63 is consistent throughout its full length and width. In reality this may not be true if air stratification exists due to the angle or pattern of the outdoor air ventilation damper 66 blades, outdoor wind turbulence, or wind gusts caused by the shape of the building and adjacent buildings and objects and direction of the wind. Typically, the freeze stat 59 is designed to sense the average temperature throughout its capillary and trigger its two-position relay output in the event that the temperature is too cold, but does not fully compensate for a large degree of stratification causing sections of the water coil 63 and the freeze stat 59 capillary to be at different temperatures.

It is desirable to provide art apparatus to overcome the sensing problems highlighted above and to also provide installation savings by having fewer components to purchase, mount, wire, and test than with the traditional HVAC systems. The conventional systems, such as that shown in FIG. 1, operate under the assumption that the water coil 63 temperature always follows the nearby air temperature and that the freeze stat 59 accurately senses the air temperature. A short duration cold temperature can force the freeze stat 59 to sense a cold temperature even if the water temperature is above freezing causing a false freeze condition and wasting energy. Some HVAC design engineers try to minimize false freeze detection with limited success by adding time delay relays with delays of 0.5 to 5 minutes to prevent spurious freeze stat trips.

An inaccurate freeze stat 59 with a low side sensing error can also prematurely force the valve full open if the water is above freezing and waste energy especially with a manual reset freeze stat that may stayed tripped for a long period of time until it is manually reset. Conversely, an inaccurate freeze stat 59 with a high side sensing error can incorrectly fail to sense a true freeze condition resulting in extensive water coil 63 and building damage. Most freeze stats have field adjustable trip point settings, and are not always properly set to represent a freeze condition. Some HVAC engineers specify a trip setpoint of 38° F. (3° C.) with the assumption that the freeze stat 59 capillary temperature follows the water temperature and that a 38° F. (3° C.) setting will protect the coil and not trip too early.

An alternate approach to achieving freeze protection in HVAC coils 63 in closed loops is the addition of an anti-freeze to prevent the rigid pipes and coils from undergoing physical stresses, deformation, and rupture due to the expansion that occurs when water turns to ice. Compounds are added to the water to reduce the freezing point of the mixture below the lowest temperature the system is likely encounter. The most frequently used antifreeze compounds for HVAC closed loop systems are ethylene glycol and propylene glycol. One of the most important characteristics of glycol is its viscosity because of its influence on the ease of pumping and its impact on heat transfer. Viscosities of glycols vary inversely with temperature. Hot glycols flow freely, but their viscosities increase as they cool until they eventually set and no longer flow. Glycol water mixtures are more viscous than water alone and their viscosities become greater as the glycol content is increased, or if the water mixture temperature is lowered.

Ethylene glycol has a lower cost, lower viscosity, and better heat transfer properties than propylene glycol. However, ethylene glycol is not as environmentally friendly as propylene glycol due to its moderate toxicity. The proper concentration of glycol to water is required to obtain the desired freeze protection level with higher concentrations of glycol by volume lowering the freezing points of the system.

Figure 5B:
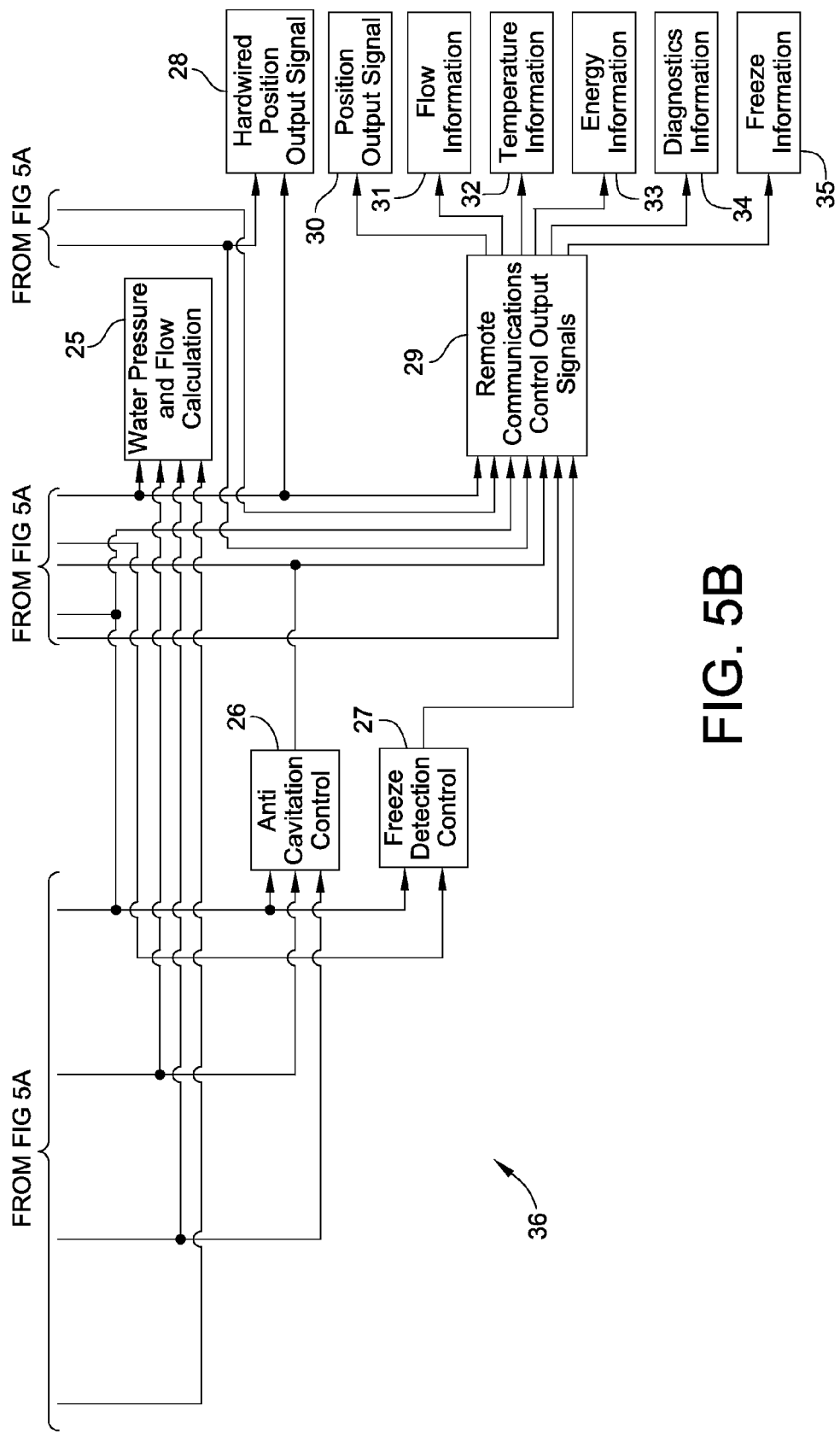

The schematic diagrams of FIGS. 5-10, which will be described below, illustrate various improvements over the prior art. In accordance with an aspect of the invention illustrated in the schematic diagram of FIGS. 5A and 5B, a valve and actuator assembly 36 includes a valve 18, an actuator 14, a room temperature controller 8, a water temperature sensor 22, a flow rate sensor 19, and freeze detection controller 27 in one integral assembly that is much faster to install because only one device has to be mounted and wired, rather than multiple separate devices, as with the system 110 of FIG. 1. The embodiment of FIGS. 5A and 5B also show that the valve 18 includes and inlet valve pressure sensor 20 and an outlet valve pressure sensor 21 so that the pressure drop across the valve 18 can be obtained. FIGS. 5A and 5B show the invention with the valve and actuator assembly 36 with integral freeze protection having the entire functionality of several traditional devices, all requiring individual mounting and inter-connective wiring. The valve and actuator assembly 36 can be field-configured to operate as a pressure-dependent or a pressure-independent valve, and will provide energy efficient freeze protection in either valve control mode.

Pressure-dependent control valves are selected primarily on pressure drop through the coil, valve flow coefficient factor, and close-off rating. The valve flow coefficient factor is the measurement of flow expressed by the term Cv which is defined as one US gallon (3.8 liters) of 60° F. (15.6° C.) water during one minute with a one psi (6.9 kPa) pressure drop. A valve's rated Cv is taken when it is fully open, and will vary when the valve plug is at other positions. At a particular valve plug position the flow rate of the pressure dependent valve changes based on the differential pressure across the valve (which varies with the pump curve and interaction of the other valves in the system).

The Cv can be expressed mathematically as:

$$Cv = \frac{GPM}{\sqrt{\Delta P}} = GPM\sqrt{\frac{SpecificGravity}{\Delta P}}$$

Cv = Coefficient of Flow

GPM = US gallons per Minute at 60° F., 15.6° C.

$\Delta P$ = Differential pressure in PSI

SpecificGravity = Specific Gravity of the Fluid

In the International System of Units the Cv is expressed as the Kvs which is defined as the flow in cubic meters per hour (m3/h) of 15.6° C. water with a pressure drop of 100 kPa (1.0 Bar) with the valve fully open, and can be expressed mathematically as:

$$Kvs = \frac{m3/h}{\sqrt{\Delta P}} = m3/h\sqrt{\frac{SpecificGravity}{\Delta P}}$$

Kvs = Coefficient of Flow m3/h = Cubic meters/hour at 15.6° C.

$\Delta P$ = Differential pressure in Bar (1 Bar = 100 kPa)

SpecificGravity = Specific Gravity of the Fluid

The specific gravity of a liquid is the ratio of the density of the liquid compared to the density of pure water at 39° F., (4° C.). Specific gravity is a ratio which has no units. A liquid with a specific gravity less than one will float in water because its density is less than the density of water. Conversely a liquid with a specific gravity greater than one will sink in water because its density is greater than the density of water. Ethylene and propylene glycol water mixtures have specific gravities of greater than one and therefore have a density greater than water.

When the water flows through a valve, it accelerates in the valve's restricted flow path which results in a decrease in pressure. The water reaches its highest velocity at a point called vena contracta. The fluid is at its lowest pressure and highest velocity at the vena contracta. As the water exits the valve some of the pressure loss is recovered as the liquid decelerates. As a consequence, the pressure in the valve may be lower than the downstream pressure. If the pressure in the valve drops below the vapor pressure of the water, it will start to vaporize. This condition, known as cavitation, will result in a lower flow rate than calculated in the Cv and Kv formulas above because when cavitation water bubbles form in the vena contracta, the vapor bubbles will increasingly restrict the flow of water until the flow is choked with vapor. This condition is known as choked or critical flow. When the flow is fully choked, the flow rate does not increase when the pressure drop is decreased.

When cavitation occurs, the water in the valve rapidly converts to a vapor and then experiences a pressure recovery to some pressure above the vaporizing pressure causing an implosion or collapse of the vapor bubbles. This can result in mechanical corrosion or pitting damage to the valve components immersed in the water, breakage of the valve components due to extreme vibration, and detectable noise in the valve. The valve components most at risk for cavitation damage are valve plugs and seats that have parallel running surfaces. The mechanical pitting and corrosion will vary with various valve material compositions. Cavitation occurs when the vapor pressure is more than the vena contracta pressure, but less than the outlet pressure. When the vapor pressure is less than the vena contracta pressure, there is full water flow with no cavitation.

Figure 11:
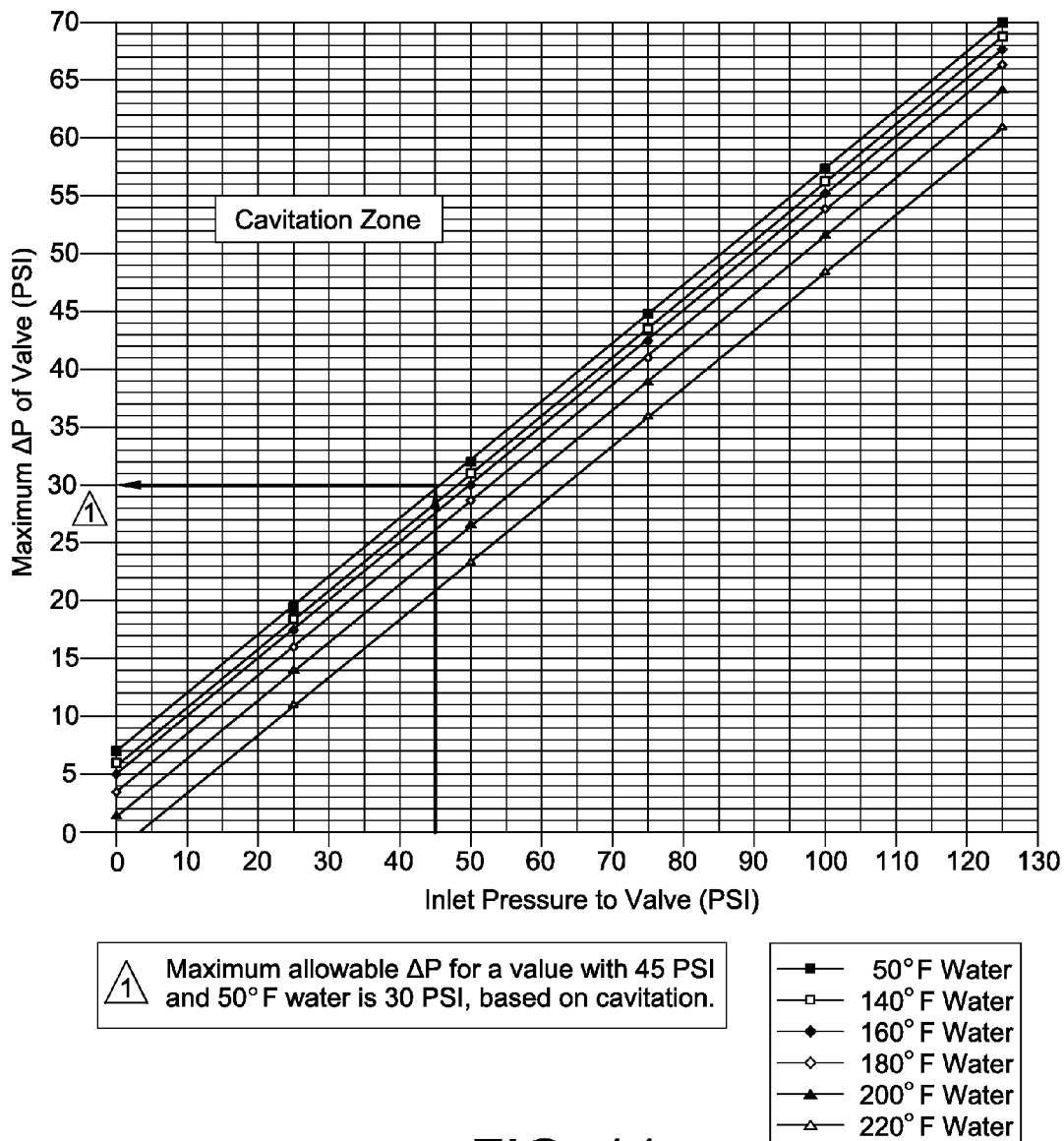
FIG. 11 is a graphical illustration of a cavitation zone water temperature relationship, in accordance with an embodiment of the invention.

The maximum allowable pressure differential across a valve that is possible without a cavitation condition depends upon the temperature of the water, because the vapor pressure of the water varies with the water temperature. When water is in a confined closed container, an equilibrium exists between the water and its gaseous state. The vapor pressure does not depend on the amount of water. The boiling point is the temperature where the vapor pressure reaches the atmospheric pressure, which varies with the altitude. Since the vapor pressure of water increases with water temperature, with warmer water the cavitation condition occurs at lower differential pressures than with cool water, as shown in FIG. 11. For example, the maximum allowable differential pressure without cavitation for a valve with a 45 psi (310 kpa) inlet pressure and 50° F. (10° C.) water temperature is 31 psi (214 kpa). With the same 45 psi (310 kpa) inlet pressure and with a 220° F. (104° C.) water temperature the maximum allowable differential pressure without cavitation drops to 21 psi (145 kpa).

Vapor pressures vary with the type of liquid. Although different liquids have vapor pressures that all generally increase as the temperature increases, and which decrease as the temperature decreases, the rate of change, as well as the boiling point, varies with each liquid. Glycols have lower vapor pressures than water and their boiling points are above the boiling point of water. At 68° F. (20° C.), the vapor pressure of water is more than 100 times as great as that of propylene glycol. The vapor pressure of systems containing a mixture of ethylene glycol or propylene glycol and water will be different than the vapor pressure of systems with just water. Further, the vapor pressures will vary with the concentration volume of ethylene glycol or propylene glycol relative to the water in the system. Water systems using a glycol water mixture rather than just water will have different cavitation points as a result of their different vapor pressures.

Pressure-independent valves are generally selected based on the maximum design flow rate of the coils they are being used to control. Pressure-independent valves provide a constant flow volume with a particular control input signal irrespective of the differential pressure. Typically, this is accomplished either by use of an internal differential pressure controller or by measuring the flow volume and automatically adjusting the valve plug to maintain a constant flow volume. Pressure-independent valves provide this constant flow volume over a defined differential pressure range. They also have a maximum flow rate that limits the flow if the valve's control signal commands it to its full open position.

In particular embodiments, pressure-independent valves increase energy efficiency by allowing the pump's variable frequency drive (VFD) to run at its lowest possible speed to satisfy the demand of the system. These valves may also minimize interaction with other valves, and lower installation costs because manual flow balancing is simplified and commissioning time significantly reduced. Further, pressure-independent valves may increase the efficiency of the chiller/boiler system by maintaining a more constant temperature drop across the coils. Pressure-independent valves can also act as automatic balancing valves by providing a constant control input signal to the control valve, or by providing the maximum control input signal when the valve's maximum rated flow matches the required balancing flow rate.

In a particular embodiment of the invention, the valve and actuator assembly 36 includes valve 18, valve actuator 14, room temperature controller 8, water temperature sensor 22, flow rate sensor 19, inlet and outlet pressure sensors 20, 21, valve plug position sensor 23, and freeze detection controller 27 in one integral assembly. In more particular embodiments, the valve and actuator assembly 36 can be configured by the user for either pressure-dependent (PD) or pressure-independent (PI) valve control. In certain embodiments of the invention, the valve and actuator assembly 36 is configured to provide pressure-dependent or pressure-independent control using a separately connected temperature controller rather than an internal temperature controller.

In a particular embodiment, field selection between pressure-dependent and pressure-independent via jumper switch, for example, by selecting the desired mode on PI-PD mode jumper 16, shown in FIG. 5A. In some embodiments, the valve and actuator assembly 36 receives signals from the room temperature sensor 1 and room setpoint device 2, and determines whether there is a requirement to open or close the linear plug movement valve 18, based on the difference between the room temperature sensor 1 and room setpoint 2. The linear plug movement valve 18 is mechanically positioned by the linear valve stem movement actuator 14, which receives its signal from PI-PD mode selection device 15. The linear plug movement valve 18 has a plug that is movable along the longitudinal flow axis of the valve port positioned between its inlet passageway and outlet passageway. The linear plug movement valve 18 includes a stationary sealing port, or valve seat, and a generally cylindrically-shaped outer plug that travels in a linear plane from the stationary sealing port upward toward its maximum open position, which is limited by the opposite linear plug movement valve 18 outer wall for pressure-dependent operation, or by the valve and actuator assembly 36 with integral freeze protection electronically controlled position for pressure-independent operation.

The linear valve stem movement actuator 14 can be set for sensitive or less sensitive control with a deadband setting to prevent overshoot in water systems that are oversized relative to the controlled area. The PI-PD mode selection device 15 utilizes either a pressure-dependent or pressure-independent control algorithm depending upon the position of the PI-PD mode jumper 16. When the valve and actuator assembly 36 with integral freeze protection is setup for a pressure-dependent valve operation from the PI-PD mode jumper 16, the PI-PD mode selection device 15 receives its signal from the pressure-dependent mode water valve position controller 11.

Figure 7:
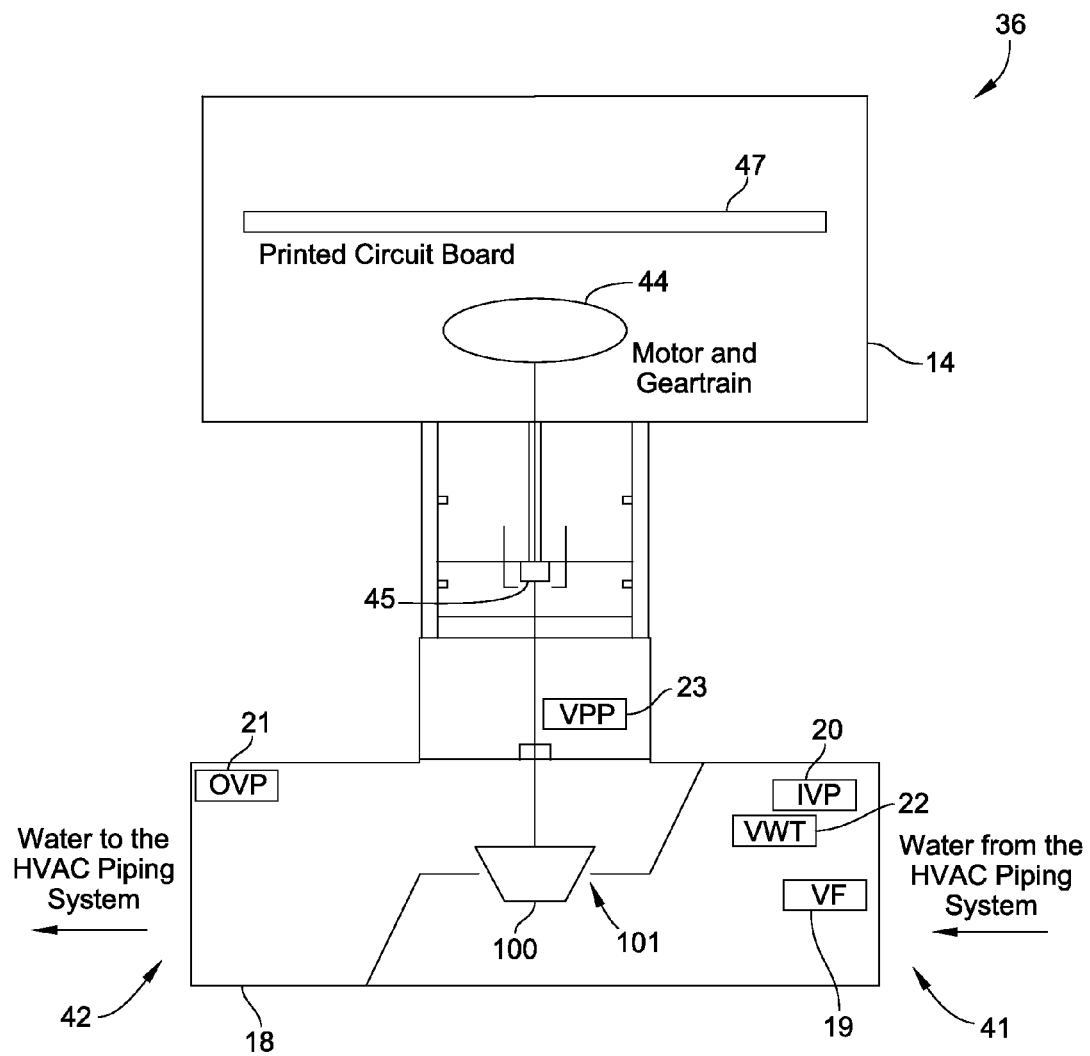
FIG. 7 is a physical diagram of the new art design contained in an integrated package.

FIG. 7 is a schematic diagram of the valve and actuator assembly 36 configured with integral freeze protection, in accordance with an embodiment of the invention. The valve and actuator assembly 36 includes the valve 18 with valve plug 100, which seats in valve seat 101. The valve 18 further includes flow rate sensor 19, an inlet 41, which receives water or a water mixture from the HVAC piping system, with inlet pressure sensor 20, and an outlet 42, which supplies water or a water mixture to the HVAC piping system, with outlet pressure sensor 21. The valve 18 also has a water temperature sensor 22 and a plug position sensor 23.

The valve plug 100 position is controlled by the valve actuator 14, which positions the valve plug 100 using a motor and geartrain 44 coupled to the valve plug 100 via a linkage assembly 45. The valve actuator 14 further includes a circuit board 47, which in particular embodiments, contains circuitry for the various controllers, control modules, and network communications modules described herein and shown schematically in FIGS. 5A and 5B.

Figure 8:
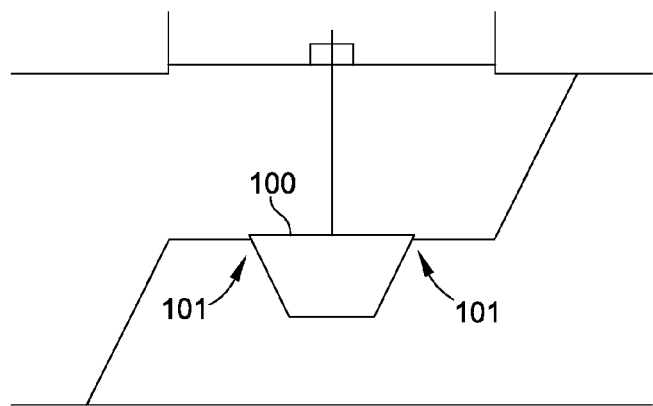
FIG. 8 is a schematic diagram showing the valve plug closed, in accordance with an embodiment of the invention.
Figure 9:
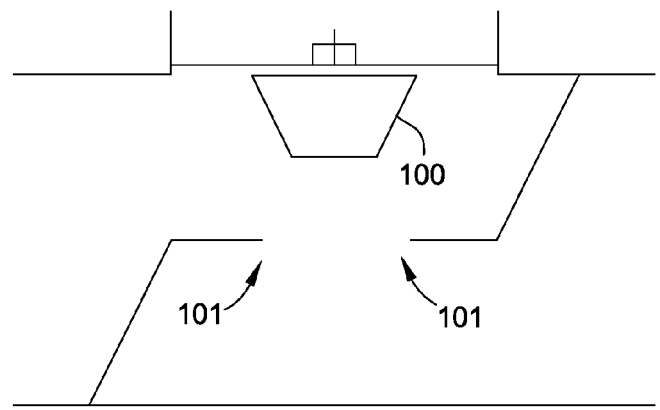
FIG. 9 is a schematic diagram of the valve plug open for pressure dependent control, in accordance with an embodiment of the invention.
Figure 10:
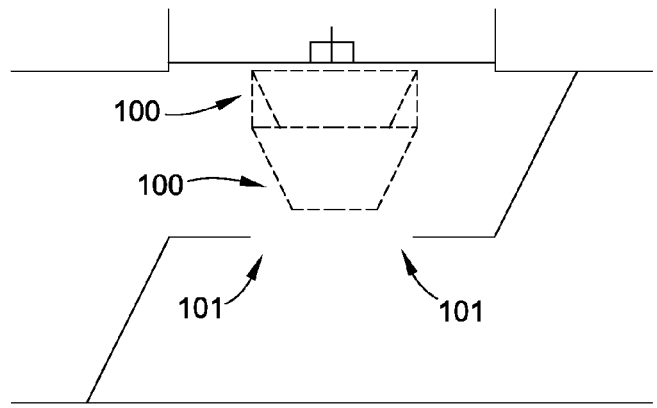
FIG. 10 is a schematic diagram of the valve plug open for pressure independent control, in accordance with an embodiment of the invention.

FIGS. 8-10 are schematic representations showing various modes of operation for the valve plug 100. Specifically, FIG. 8 shows the minimum-flow or closed position of the linear plug movement valve's plug 100. This shows the position of the valve plug 100 when fully closed against the valve seat 101. In this position, there is no flow except possibly a very small amount of leakage through a possible small gap between the valve plug 100 and the seat 101. The minimum-flow or closed position of the valve plug 100 for the linear plug movement valve is relevant for both pressure-dependent and pressure-independent valve operation.

When the PI-PD mode jumper 16 is setup for pressure-dependent valve operation, the maximum-flow position of the valve plug 100 is fully open as shown in FIG. 9, such that the flow volume will vary with the differential pressure across the valve. When the PI-PD mode jumper 16 is setup for pressure-independent operation, the maximum-flow position of the valve plug 100 will vary, as shown in FIG. 10, and is controlled by the pressure-independent mode water valve position controller 13, based on the remote maximum flow signal 4, regardless of the temperature difference between the room temperature sensor 1 and the room setpoint device 2. Maximum flow is maintained in the pressure-independent mode because the flow rate needs to be limited to allow adequate time for the water or water glycol mixture to be in the coil to provide proper heat transfer.

Although aspects of the invention have been described with respect to some preferred embodiments, those skilled in the art will recognize that changes may be made in form and detail without departing from the scope and spirit of the invention. For example, HVAC control valves can have linear motion plug travel, such as with a globe valve or gate valve, or can have angular rotation plug travel, such as with a ball valve, butterfly valve, or shoe valve. Embodiments of the invention may include, but is not limited to, any of the aforementioned valve types, including the linear plug movement valve 18.

In the embodiment of FIGS. 5A and 5B, the valve and actuator assembly 36 includes a valve flow rate sensor 19, an inlet valve pressure sensor 20, an outlet valve pressure sensor 21, a valve plug position sensor 23, an anti-cavitation control module 26, and an energy consumption calculation and retention module 24. The valve and actuator assembly 36 with integral freeze protection is suitable for use with a variety of flow rate sensors 19 and a variety of pressure sensing technologies. These include, but are not limited to: 1) differential pressure; 2) positive displacement; 3) velocity; and 4) mass flow.

The operation of differential pressure sensors is based on the premise that the pressure drop across the valve is proportional to the square of the flow rate. Typically, the flow rate is obtained by measuring the pressure differential and extracting the square root. This requires a primary element to cause a kinetic energy change (e.g., constriction in the line to create a difference in upstream and downstream pressures), and a secondary element to measure the differential pressure. Available differential pressure sensors include, for example, orifice plate sensors, venturi tube sensors, flow tube sensors, flow nozzle sensors, pitot tube sensors, elbow tap sensors, target, variable-area sensors (rotameter), annubar sensors, and v-cone sensors.

Positive displacement sensors divide the liquid into specific discrete increments and move it on. The total flow is an accumulation of the measured increments and is usually a series of counts that are tallied over a period of time and stored into a register. Available positive displacement sensors include reciprocating piston, oval gear, nutating disk, rotary vane, and helix.

Velocity sensors operate linearly with respect to the volume flow rate, and are available using several different technologies including turbine sensors, vortex shedding sensors, swirl sensors, conada effect & momentum sensors, exchange sensors, electromagnetic sensors, ultrasonic sensors, Doppler sensors, and transit-time sensors.

Mass sensors measure the mass rate of the flow directly as opposed to the volumetric flow with various designs available including calorimetric (thermal dispersion) sensors, coriolis sensors, and thermal sensors.

In certain embodiments of the invention, the valve and actuator assembly 36 with integral freeze protection is configured to operate in a stand-alone non-communicating mode with total localized control, while in alternate embodiments, the valve and actuator assembly 36 with integral freeze protection is configured to operate in a communicating network that allows information to be sent and received by the valve and actuator assembly 36 in order to synchronize its operation with the building management system (BMS) and with other HVAC equipment (e.g., heating, cooling, pumping systems) in the building to provide diagnostic and energy data for remote monitoring, alarming, and data retention.

The remote communications control input signals 7 receive relevant valve and HVAC coil system data from the building management system (BMS) via a serial communication bus including the heat cool mode signal 3, remote maximum flow signal 4, and remote minimum flow signal 5. These signals allow the valve and actuator assembly 36 with integral freeze protection to be synchronized with the BMS and the building's mechanical heating, cooling, and pumping systems to increase the energy efficiency of the building's HVAC system. These signals are retentively stored in the remote communications control input signals 7 such that the operation of the valve actuator assembly with freeze protection 36 can be adapted for the HVAC mechanical piping system in a stand-alone mode or in a communicating network mode. The retentively stored signals also allow for proper operation in a communicating network mode if for any reason communications to the BMS network are lost.

Figure 6:
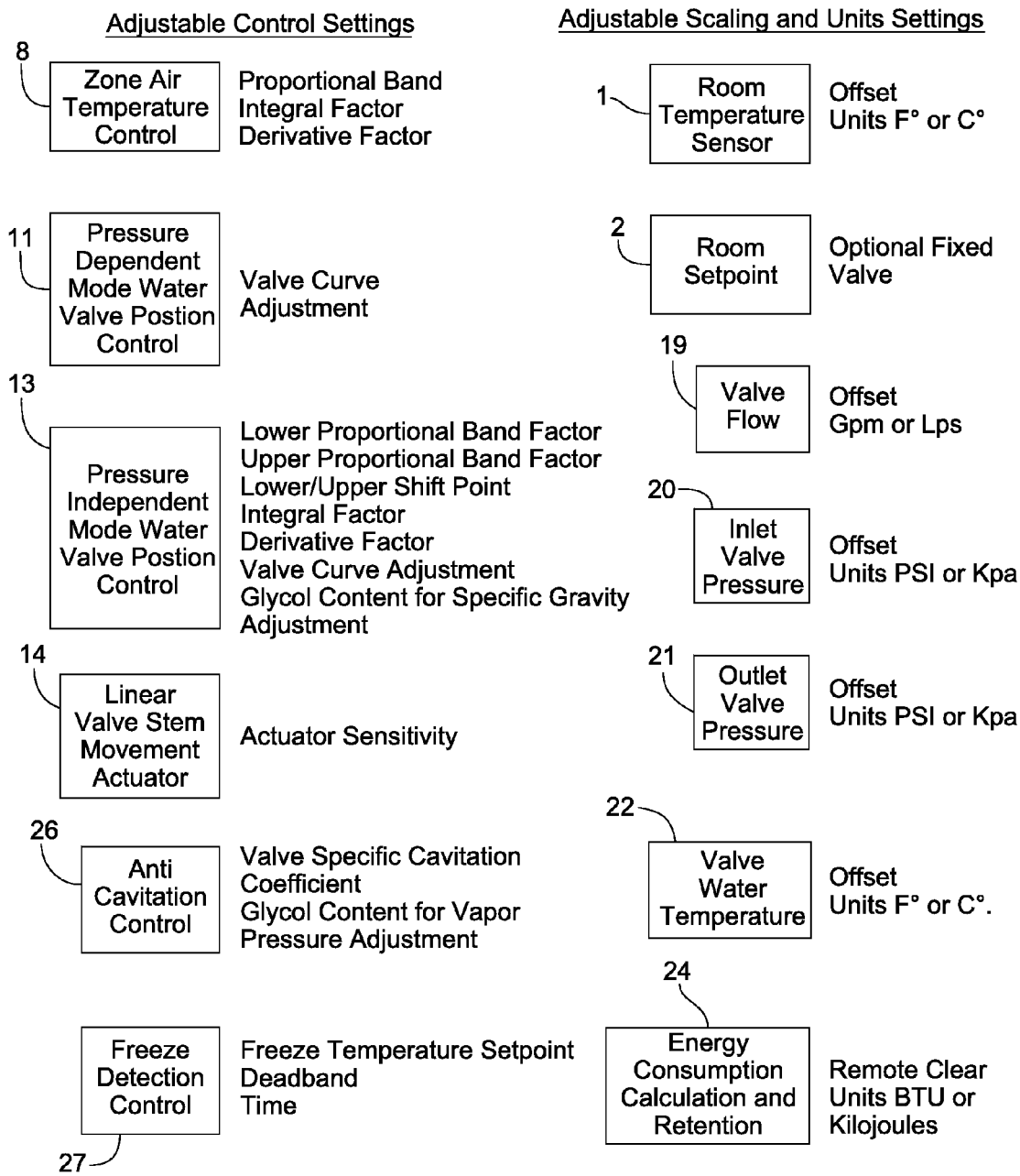
FIG. 6 is a block diagram illustrating adjustable setting for the integral valve and actuator assembly, according to an embodiment of the invention.

For stand-alone operation, the remote communications control input signal 7 values can be edited with a software programming tool that is initially used to establish the valve and actuator assembly 36 with integral freeze protection settings, but is not required to be left with the valve and actuator assembly 36. The software programming tool is also used to initially adjust operating parameters that are used for the valve and actuator assembly 36 basic operation, as shown in FIG. 6, for both the stand-alone and network communication modes. The adjustable operating parameters, shown in FIG. 6, have default settings that are preset to values that provide stable control for typical HVAC water systems, such that the valve and actuator assembly 36 with integral freeze protection will work reasonably well with all systems without adjustment. The optional adjustments will allow users to customize behavior of the valve and actuator assembly 36 to better work with the building management system if it is desired to further optimize the valve and actuator assembly 36 to match the unique HVAC conditions of the building.

Some of the adjustable operating parameters, shown in FIG. 6, are for the optional calibration of input sensors by means of changing an offset value, with a default setting of zero, to a positive or negative number to negate any error, if it is determined by an optional independent test measurement that an input sensor does not match another calibrated measurement. Other adjustable operating parameters, shown in FIG. 6, include selection of units for operation in different countries, and for the selection of different units for temperature, pressure, flow, and energy calculated values.

The pressure-dependent mode water valve position controller 11 receives inputs from the water pressure and flow calculation module 25 which provides the volume of water flowing through the valve, from the water coil minimum flow control module 10, which specifies the minimum water flow that is required during a potential freeze condition, from the zone air temperature controller 8 to provide an output control signal, and from the anti-cavitation control module 26, which indicates when inlet and outlet pressures are such that a cavitation condition can occur. The zone air temperature controller 8 compares the room temperature sensor 1 and room setpoint device 2 values received from the local hardwired control input signal 6, and determines if the valve 18 needs to proportionally open or close to maintain the desired room temperature. The pressure-dependent mode water valve position controller 11 uses a linear input signal to output command relationship that retains the inherent linear plug movement valve 18 water flow curve, unless an alternate curve adjustment has been optionally setup.

The proper direction of opening and closing the valve is determined by the heat cool mode signal 3. The proper direction of opening and closing the valve 18 will vary depending if the valve water source is providing hot water which will require that the valve 18 open to warm up the room or cold water which will require that the valve 18 close to warm up the room. The heat cool mode signal 3 has a local non-volatile mode selection, which can be fixed to define the direction of opening or closing the valve 18 if it is always operated with hot or cold water, or it can be overridden by the BMS from a remote location, by means of a serial communications bus, if the water temperature changes from hot to cold.

The zone air temperature controller 8 mathematically calculates the difference between the room temperature sensor 1 and room setpoint device 2 values, and then provides an empirical position for the linear valve stem movement actuator 14 using its adjustable proportional band setting. The empirical position for the linear valve stem movement actuator 14 uses the valve plug position sensor 23 and room temperature sensor 1 values to verify that the valve plug is being properly positioned to maintain the value input into the room setpoint device 2. The valve plug position sensor 23 feedback value is used to verify that the valve plug position is in its commanded position regardless of the internal valve pressures, which will change as the pump curve dynamically shifts along with the position of other valves in the piping system that affect the piping system's pressures.

The room temperature sensor 1 feedback value is used to verify that the calculated linear plug movement valve 18 position will provide the correct amount of heat transfer so that the room temperature sensor 1 will be at the same or very close to the room setpoint 2 value. Because the room heat loss and gain will not always be the same as the heat provided from the HVAC water coil heat transfer, via the linear plug movement valve 18, a varying temperature droop or offset difference will result at times between the room temperature sensor 1 and the room setpoint device 2 values. The temperature droop between the room temperature sensor 1 and room setpoint device 2 can be greatly minimized by the adjustable zone air temperature controller 8 integral setting, which provides a negative or positive adjustment value that is additive to the commanded position of the linear valve stem movement actuator 14. This will further drive the linear plug movement valve 18 to provide more or less heat to eliminate the difference between the room temperature sensor 1 and the room setpoint device 2 values. Also available in the zone air temperature controller 8 is an optional derivative setting to anticipate fast changes to the room temperature to improve the HVAC system response when there are large load changes.

In a particular embodiment, the pressure-dependent-mode water valve position controller 11 uses the zone air temperature controller 8 as its primary input, and then makes a comparison of its water pressure and flow calculation module 25 input and its water coil minimum flow control module 10 input to determine if the water and flow conditions are such that the calculated outputs of the zone air temperature controller 8 need to be overridden to a higher flow level to avoid a freeze condition of the HVAC water coil 63 (shown in FIG. 1) and associated piping system. The actual valve water temperature sensed by water temperature sensor 22 is used for freeze determination to avoid the issues that can result from assuming that the nearby air temperatures are the same as the water temperature. For example, an error such as this may cause the system to waste energy by forcing the water flow through the valve 18 to a full-flow condition when it is not required. It could also result in the system failing to sense a freezing water condition due to improper freeze stat mounting or due to air stratification.

The valve water temperature sensor 22 may be made from a resistive temperature device (RTD) that is located in the external wall of the linear plug movement valve 18 along with a thermally conductive grease to provide good heat transfer. The resistance of the RTD is measured by connecting it in series with a known reference resistor and applying a current to both resistances. The voltages across the resistances are then measured, and then digitized to represent the water temperature.

When a potential freeze condition is detected by the valve water temperature sensor 22, the water coil minimum flow control module 10 and pressure-dependent-mode water valve position controller 11 will override the zone air temperature controller 8 to provide the minimum amount of flow that is required to avoid a freeze condition as established by the remote minimum flow signal 5. In an example of system operation, the minimum flow continues until the water temperature rises at least 10° F. (5.6° C.) above the freeze temperature setpoint for 5 minutes or longer with the temperature differential, time period, and freeze temperature setpoint settings being field-adjustable by means of the freeze detection control module 27. In another example, the freeze protection is of the automatic reset type, and will revert back to zone air temperature control 8 after the temperature differential and time period requirements have been fulfilled.

Embodiments of the invention overcome a limitation of the traditional hard-wired automatic reset freeze stats of not alerting the building personnel that there may be a problem with the outdoor air ventilation controller, outdoor air ventilation actuator, or outdoor air ventilation damper, and also avoids a limitation of conventional hard-wired manual reset freeze stats in which normal control is disabled until the manual reset freeze stat is manually accessed and reset.

The anti-cavitation control module 26 uses the inlet valve pressure sensor 20, outlet valve pressure sensor 21, valve water temperature sensor 22, and the valve-specific cavitation coefficient to determine whether a cavitation condition exists, or to predict whether cavitation will occur. Since the water temperature affects the cavitation zone, which is also dependent on the valve's maximum allowable pressure differential, the anti-cavitation control module 26 uses the water temperature to calculate the fluid vapor pressure, which is used with the inlet valve pressure sensor 20, and with the outlet valve pressure sensor 21 to predict the point of incipient cavitation.

The valve-specific cavitation coefficient is unique to each valve, and is based on the ratio of the differential between the external inlet and external outlet pressures to the differential between internal inlet and the minimum valve pressures. Generally, the valve-specific cavitation coefficient is laboratory-confirmed by means of noise testing, as cavitation in a valve is usually a gradual process starting with only small portions of the valve plug experiencing vapor bubbles along with the consequential noise. The glycol content is used for a vapor pressure adjustment, as the vapor pressure varies with the water glycol mix as well as with the water temperature. Upon calculation of a possible cavitation condition by the anti-cavitation control module 26, the pressure-dependent-mode water valve position controller 11 overrides the zone air temperature controller 8 to reduce the valve's 18 differential pressure drop until it is out of the cavitation zone.

The maximum permissible pressure drop across the valve which is not to be exceeded to avoid cavitation is determined by the following calculations:

$$\Delta P = VSCC*(P1-Pv)$$

$\Delta P$=Pressure drop of incipient cavitation
VSCC=Valve Specific Cavitation Coefficient
P1=Valve Inlet Pressure (psia)
Pv=Vapor pressure of Water Mixture at Flowing Water Temperature (psia)
Psia=psig+14.7
The Pv is calculated by the anti-cavitation control module 26 look up table referencing the water mix glycol content and the water mix temperature.

In certain embodiments, the valve plug position sensor 23 is used for remote indication and verification that the actual flow matches the commanded position. The hardwired position output signal 28 and the remote communications control output signal 29 receive signals from the valve plug position sensor 23 and water pressure and flow calculation module 25, and provide the true valve flow as a percentage of the total flow. The hardwired position output signal 28 provides a direct current output voltage signal, and the position output signal 30 provides a serial data communications numerical value output signal to the BMS that it receives from remote communications control output signal 29.

In embodiments of the invention, the hardwired position output signal 28 and the position output signal 30 overcome the inherent issues present in conventional control valves of estimating the water flow position from the valve actuator position. This conventional method introduces an error because the actuator position only indicates the valve plug position and not the flow percentage, because the valve 18 water flow is not always linear relative to its position, and because there is a mechanical linkage between conventional valve actuators and valves that can introduce an error from backlash, movement hysteresis, or malfunction.

For both pressure-dependent and pressure-independent operation, the remote communications control output signal 29 receives relevant valve 18 and HVAC coil system 63 (shown in FIG. 1) data values, which may be transmitted to the BMS via the serial data communications bus. In some embodiments, this data may include the water flow information calculated by the water pressure and flow calculation module 25, the water temperature value provided by the valve water temperature sensor 22, energy information as calculated by the energy consumption calculation and retention module 24, diagnostics information received from the actuator stroke and force status module 17, diagnostic reports from the anti-cavitation control module 26, and the freeze control history from the freeze detection control module 27.

In a further embodiment, the energy consumption calculation and retention module 24 uses the valve water temperature sensor 22 and flow information from the water pressure and flow calculation module 25 to calculate the heat energy in British Thermal Units (BTU) or kilojoules for the International System of Units, along with totalized values for energy consumption tracking The accumulated energy information can be cleared out by the BMS so that it can remotely store the information for permanent retention. The remote communications control output signal 29 provides the position output signal 30, flow information 31, temperature information 32, and energy information 33 to the serial communications bus for remote energy reporting and retention.

In a particular embodiment, a diagnostics information module 34 provides diagnostics information received from the actuator stroke and force status module 17, including a determination as to whether the valve stroke length has changed due to debris in the valve 18 or from a mechanical linkage or valve component malfunction. This is detected by a comparison between the actuator's current operating stroke range and operating force and the initial stroke range and operating force that is retentively stored in the actuator. In an embodiment, the diagnostics information module 34 also provides diagnostic information received from the anti-cavitation control module 26 indication of the presence and duration of a cavitation condition. The freeze information module 35 provides information regarding the number of freeze occurrences and total freeze mode duration, for example, during the last seven days.

When the valve and actuator assembly 36 with integral freeze protection is setup for pressure-independent valve operation through the PI-PD mode jumper 16, the PI-PD mode selection device 15 receives its signal from the pressure-independent-mode water valve position controller 13. In a particular embodiment, the pressure-independent mode water valve position controller 13 uses inputs from the flow reset program 12, the water coil maximum flow controller 9, water coil minimum flow controller 10, and uses water flow information calculated by the water pressure and flow calculation module 25, and the anti-cavitation control module 26.

The flow reset program 12 converts calculated numerical position from the zone air temperature controller 8 for the linear valve stem movement actuator 14 to a calculated position to provide water flow control. As with the pressure independent algorithm, the primary control is water flow control that is determined by the room temperature setpoint. The pressure-independent-mode water valve position controller 13 has an adjustable lower proportional band, upper proportional band, proportional lower/upper shift point, and upper and lower integral and derivative settings to obtain accurate and stable flow control. The two different proportional settings are available to de-sensitize the pressure-independent flow control at higher flow rates along with an adjustable shift point that determines if the upper proportional band, upper integral setting, and upper derivative setting are active, or if the lower proportional band, lower integral setting, and lower derivative setting is active.

The proportional band acts as the gain of the control loop. A small proportional band provides a higher gain or sensitivity, and a large proportional band provides less sensitive control. The lower proportional band setting is in effect at flow rates up to the adjustable shift point of the remote maximum flow signal 4, and the upper proportional band setting is in effect at flow rates above the adjustable shift point of the maximum flow signal 4. As with all the other valve and actuator assembly 36 with integral freeze protection settings, the lower proportional band, upper proportional band, proportional band lower/upper shift point, and upper and lower integral and derivative settings are preset to values that provide stable control for the typical HVAC water systems. The integral settings provide negative or positive adjustments factors that are additive to the linear valve stem movement actuator 14 commanded position when the controlled flow does not match the flow setpoint calculated by the flow reset program 12. Also available in the pressure-independent mode water valve position controller 13 are optional derivative settings to anticipate fast changes to the room temperature to improve the HVAC system response when there are large load changes. The pressure independent mode water valve position controller 13 uses a linear output command relationship, which retains the linear plug movement valve 18 water flow curve, unless an alternate curve adjustment has been optionally setup.

The pressure-independent-mode water valve position controller 13 has a glycol content setting for specific gravity adjustment, as a glycol-water mixture has a higher specific gravity than pure water. As the specific gravity increases as a result of a higher concentration of glycol in the mixture, the water flow volume will be lower at the same linear plug movement valve 18 position than with pure water. The pressure-independent-mode water valve position controller 13 compensates for the glycol-water mixture by use of the glycol content for specific gravity adjustment.

The zone air temperature controller 8 resets the flow setpoint from a minimum to a maximum flow level. The water coil maximum flow controller 9 defines the maximum flow, which is selected to match the designed maximum flow rate of the HVAC water coil 63 (shown in FIG. 1). The water coil minimum flow controller 10 establishes the minimum flow rate for the pressure-independent flow scaling and also establishes the minimum flow rate for freeze protection. The water coil minimum flow controller 10 operates using the same freeze protection sequence as when the valve and actuator assembly 36 is configured for pressure-dependent operation. The minimum flow rate is synchronized with the building's chillers and boilers to operate them at their most efficient temperature differential.

Centrifugal chillers are designed to have their highest energy efficiency when they are fully loaded and operating at their design inlet to outlet water temperature differential. If the chillers have too low a temperature differential because the chilled water valve water flow is too high (providing a lower than ideal heat transfer) or too low a flow or no flow (causing little or no heat transfer), the chiller will operate inefficiently because the return water temperature is too low. Also one chiller operating inefficiently could require another chiller to be sequenced on requiring additional energy because both chillers are operating inefficiently. Additionally, this inefficient operation increases maintenance costs.

Mechanical heating equipment also does not operate at its designed efficiency if not fully loaded. With a condensing boiler, a higher return temperature can avoid the condensing process where the dew point of the exhaust gases cannot be met. If the boilers have too low a temperature differential because the heating valve flow is too high (providing a lower than ideal heat transfer) or too low a flow or no flow (causing little or no heat transfer), the boiler will operate inefficiently because the return water temperature is too high.

The anti-cavitation control module 26 uses the inlet valve pressure sensor 20, outlet valve pressure sensor 21, valve water temperature sensor 22, and the valve-specific cavitation coefficient to determine whether a cavitation condition exists, or to predict whether cavitation will occur. Since the water temperature affects the cavitation zone that is also dependent on the valve's maximum allowable pressure differential, the anti-cavitation control module 26 uses the water temperature to calculate the fluid vapor pressure, which is used with data from the inlet valve pressure sensor 20 and the outlet valve pressure sensor 21 to predict the point of incipient cavitation.

The valve-specific cavitation coefficient is unique to each valve, and is based on the ratio of the differential between the external inlet and external outlet pressures to the differential between internal inlet and the minimum valve pressures. Generally, the valve-specific cavitation coefficient is laboratory confirmed by means of noise testing, as cavitation in a valve is usually a gradual process starting with only small portions of the valve plug 100 experiencing vapor bubbles along with the consequential noise. The glycol content is used for a vapor pressure adjustment as the vapor pressure varies with the water glycol mix as well as with the water temperature. Upon calculation of a possible cavitation condition by the anti-cavitation control module 26, the pressure-independent mode water valve position controller 13 overrides the flow reset program 12 to reduce the valve's differential pressure drop until it is out of the cavitation zone.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An HVAC valve and actuator assembly with integral freeze protection, the assembly comprising:
    a valve configured to control a flow of water or a water mixture into a water coil;
    a valve actuator configured to control opening and closing of the valve;
    a first temperature sensor configured to sense the temperature of the water or water mixture flowing through the valve;
    a second temperature sensor configured to sense the temperature of air surrounding the water coil;
    a flow meter configured to measure a flow rate of the water or water mixture through the valve;
    wherein the valve actuator includes a control module configured to receive data from the first and second temperature sensors and from the flow meter, and further configured to determine, based on data received from the flow meter and first and second temperature sensors, a likelihood that the water or water mixture in the water coil will freeze; and
    wherein the valve actuator operates the valve to allow a minimum flow of the water or water mixture through the valve and water coil sufficient to prevent the water or water mixture in the water coil from freezing.

2. The HVAC valve and actuator assembly of claim 1, wherein the valve includes a throttling plug disposed in a flow passage of the valve, the throttle plug moveable within the valve to control the flow of water or water mixture in the flow passage.

3. The HVAC valve and actuator assembly of claim 1, wherein the valve actuator comprises:
    a motor and geartrain coupled to the throttling plug by a linkage assembly; and
    a circuit board having control circuitry to regulate operation of the motor and geartrain, and communications circuitry to enable the actuator to communicate with a building management system via a serial communications bus.

4. The HVAC valve and actuator assembly of claim 1, wherein the valve actuator is configured to operate the valve as either a pressure-independent valve or a pressure-dependent valve.

5. The HVAC valve and actuator assembly of claim 4, wherein the valve actuator operates the valve as a pressure-independent valve, and wherein the pressure-independent valve has a minimum flow rate to prevent a freeze condition in the water coil, and a maximum flow rate over a defined differential pressure range.

6. The HVAC valve and actuator assembly of claim 4, wherein the valve actuator is configured to operate the valve as either a pressure-independent valve or a pressure-dependent valve by the setting of a jumper switch.

7. The HVAC valve and actuator assembly of claim 1, wherein the flow meter comprises differential pressure sensors coupled to the valve and configured to measure a pressure drop across the valve.

8. The HVAC valve and actuator assembly of claim 7, wherein the differential pressure sensors comprise one of venture tube sensors, orifice plate sensors, pitot tube sensors, flow tube sensors, flow nozzle sensors, target sensors, elbow tap sensors, annubar sensors, v-cone sensor, and rotameter sensors.

9. The HVAC valve and actuator assembly of claim 1, wherein the flow meter comprises mass flow sensors coupled to the valve and configured to measure a mass flow rate of water or water mixture through the valve.

10. The HVAC valve and actuator assembly of claim 9, wherein the mass flow sensors comprise one of coriolis sensors, thermal sensors, and calorimeter sensors.

11. The HVAC valve and actuator assembly of claim 1, wherein the flow meter comprises at least one velocity sensor coupled to the valve and configured to measure a volumetric flow rate of water or water mixture through the valve.

12. The HVAC valve and actuator assembly of claim 11, wherein the velocity sensors comprise one of a turbine sensor, a vortex shedding sensor, an exchange sensor, an electromagnetic sensor, an ultrasonic sensor, a swirl sensor, a transit-time sensor, a Doppler sensor, and a conada effect and momentum sensor.

13. The HVAC valve and actuator assembly of claim 1, wherein the valve comprises one of a ball valve, a shoe valve, a butterfly valve, a gate valve, and a globe valve.

14. The HVAC valve and actuator assembly of claim 1, wherein the valve actuator has a plurality of adjustable operating parameters, whose values control the operation of the valve actuator.

15. The HVAC valve and actuator assembly of claim 14, wherein the plurality of adjustable operating parameters can be adjusted either locally or remotely.

16. The HVAC valve and actuator assembly of claim 1, wherein the water mixture comprises a mixture of water and anti-freeze.

17. A method of operating a valve and actuator assembly with integral freeze protection, the method comprising the steps of:
    sensing a temperature of liquid flowing through an HVAC valve into an HVAC coil used to heat or cool a space;
    sensing a temperature of air surrounding the HVAC coil;
    measuring a flow rate of the liquid flowing through the HVAC valve;
    determining a likelihood, based on the sensed liquid and air temperatures and on the flow rate measurement, that the liquid in the HVAC coil will freeze;
    controlling the flow of liquid through the HVAC valve and HVAC coil to provide a minimum flow sufficient to prevent freezing of the liquid in the HVAC coil.

18. The method of claim 17, wherein determining a likelihood that the liquid in the HVAC coil will freeze comprises determining a likelihood that the liquid in the HVAC coil will freeze, based on whether the liquid is water or water mixed with a known concentration of anti-freeze.

19. The method of claim 17, wherein controlling the flow of liquid through the HVAC valve and HVAC coil to provide a minimum flow sufficient to prevent freezing of the liquid in the HVAC coil comprises providing the minimum flow sufficient to prevent freezing of the liquid in the HVAC coil until the liquid temperature rises to a target temperature at some level above a freeze temperature setpoint, for a predetermined time period.

20. The method of claim 19, further comprising the step of discontinuing the minimum flow sufficient to prevent freezing of the liquid in the HVAC coil if it is determined that there is no likelihood that the liquid in the HVAC coil will freeze.

21. The method of claim 19, further comprising setting the freeze temperature setpoint, the target temperature, and the time period, wherein a user can set the freeze temperature setpoint, the target temperature, and the time period either locally or remotely.

22. The method of claim 19, wherein the target temperature is at least 10 degrees above the freeze temperature setpoint, and the time period is at least five minutes.

* * * * *